US009154736B1

(12) United States Patent
Pan et al.

(10) Patent No.: US 9,154,736 B1
(45) Date of Patent: Oct. 6, 2015

(54) VIDEO CONFERENCING WITH A MOBILE PLATFORM

(71) Applicant: OMNIVISION TECHNOLOGIES, INC., Santa Clara, CA (US)

(72) Inventors: Hui Pan, San Jose, CA (US); Jizhang Shan, Cupertino, CA (US); Raymond Wu, Campbell, CA (US); Kah-Ong Tan, Shanghai (CN)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/332,748

(22) Filed: Jul. 16, 2014

(51) Int. Cl.
| | |
|---|---|
| *H04N 7/14* | (2006.01) |
| *H04N 7/15* | (2006.01) |
| *H04W 28/10* | (2009.01) |
| *H04W 36/00* | (2009.01) |
| *H04W 4/16* | (2009.01) |
| *H04W 72/04* | (2009.01) |
| *H04W 40/12* | (2009.01) |

(52) U.S. Cl.
CPC ............ *H04N 7/15* (2013.01); *H04N 7/147* (2013.01); *H04W 4/16* (2013.01); *H04W 28/10* (2013.01); *H04W 36/00* (2013.01); *H04W 40/12* (2013.01); *H04W 72/04* (2013.01)

(58) Field of Classification Search
CPC ....... H04W 4/16; H04W 72/04; H04N 40/12; H04L 67/1091
USPC ........................................ 348/14.02; 709/204
See application file for complete search history.

(56) References Cited

U.S. PATENT DOCUMENTS

| | | | |
|---|---|---|---|
| 2008/0194333 A1* | 8/2008 | Zalewski ................... 463/42 |
| 2011/0093598 A1* | 4/2011 | Baratz et al. ............... 709/227 |
| 2013/0227019 A1* | 8/2013 | Vyrros et al. .............. 709/204 |
| 2013/0238698 A1* | 9/2013 | Rozinov ..................... 709/204 |
| 2013/0258866 A1* | 10/2013 | Stafford et al. ............ 370/241 |
| 2014/0192198 A1 | 7/2014 | Tsau et al. |
| 2014/0192199 A1 | 7/2014 | Tan et al. |
| 2015/0067819 A1* | 3/2015 | Shribman et al. .......... 726/12 |

OTHER PUBLICATIONS

U.S. Appl. No. 14/309,407, filed Jun. 19, 2014, Shan et al.

* cited by examiner

*Primary Examiner* — Creighton Smith
(74) *Attorney, Agent, or Firm* — Blakely Sokoloff Taylor & Zafman LLP

(57) ABSTRACT

Video conferencing for mobile platforms is provided by logging a first mobile platform into a conference server, which finds a first peer-to-peer station on a network to connect with the first mobile platform. The first peer-to-peer station is a nearest available peer-to-peer station on the network to the first mobile platform. The first peer-to-peer station on the network is connected to the first mobile platform. First communication data is received at the first peer-to-peer station directly from the first mobile platform. The first communication data is sent directly from the first peer-to-peer station to a second peer-to-peer station through a peer-to-peer connection in the network. The first communication data is sent directly from the second peer-to-peer station to a second mobile platform connected to the second peer-to-peer station. The second peer-to-peer station is a nearest available peer-to-peer station on the network to the second mobile platform.

23 Claims, 2 Drawing Sheets

VIDEO CONFERENCING WITH A MOBILE PLATFORM

BACKGROUND INFORMATION

1. Field of the Disclosure

The present invention relates generally to video conferencing, and more specifically to a mobile platform having video conferencing capability.

2. Background

It has become common to communicate using a mobile phone. For instance, two people can communicate with one another with a voice call using their mobile phones. In addition, mobile phones also allow the two people to communicate with one another using text messages as well as video calls. To communicate with more than one other person at a time, it has become common to share videos online. For instance, a video may be uploaded, which is then stored as a video file on a server in a network. A plurality of receivers may then download the uploaded video file from the server at later times for later playback. The uploading and downloading of the video file are not performed in real-time.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
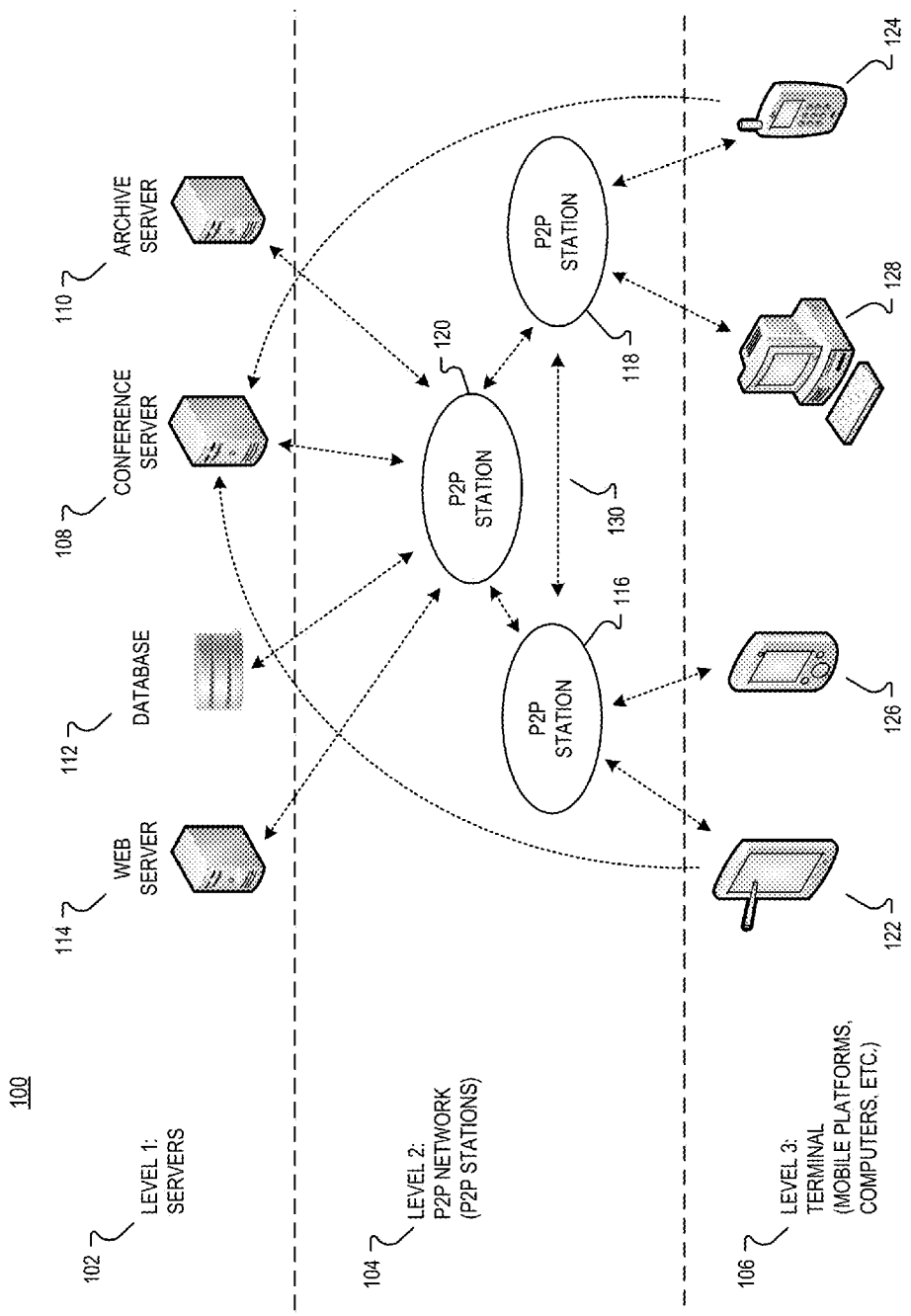
FIG. 1 shows one example of a three level network system including servers, peer-to-peer stations, and terminals that provide video conferencing for the mobile platforms in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As an increasing number of mobile platforms, such as for example mobile phones, include built-in video cameras, the ability to participate in a video conference with one or more other users on mobile platforms may be useful. As will be discussed, examples in accordance with the teachings of the present invention are directed to a network system that provides video conferencing for mobile platforms. In one example, the network system in accordance with the teachings of the present invention is a three level network that includes a conference server and an archive server at the first level, a plurality of peer-to-peer stations forming a peer-to-peer network at the second level, and a plurality of terminals including for example mobile platforms at the third level to provide video conferencing in accordance with the teachings of the present invention.

In one example, the plurality of mobile platforms initially register with the conference server, which manages the peer-to-peer stations and the mobile platforms that are registered with the conference server in the network system. Once the mobile platforms are registered with the conference server, the registered mobile platforms can contact the conference server directly to log in for a video conference. The conference server will find the nearest available peer-to-peer stations in the peer-to-peer network at that time for each mobile platform. Each mobile platform can then connect its nearest available peer-to-peer station in the peer-to-peer network at that time as identified by the conference server. Once the mobile platforms are logged into their nearest available peer-to-peer station in the peer-to-peer network, each mobile platform can send its communication data directly to its respective peer-to-peer station, and the peer-to-peer stations then send and receive the communication data to and from each other directly through peer-to-peer connections in the network. Each peer-to-peer station can than can send the received communication data directly to its respective mobile platform for playback on the mobile platform in accordance with the teachings of the present invention.

To illustrate, FIG. 1 shows one example of a network system 100 in accordance with the teachings of the present invention. As shown in the depicted example, network system 100 includes three levels including Level 1 102, Level 2 104, and Level 3 106. In one example, Level 1 102 of network system 100 includes a plurality of servers including a conference server 108, and archive server 110, as well as a database 112 and a web server 114. In the example, Level 2 104 of network system 100 includes a peer-to-peer network formed with a plurality of peer-to-peer stations, including for example peer-to-peer station 116, peer-to-peer station 118, and peer-to-peer station 120, as shown in FIG. 1. Continuing with the depicted example, Level 3 106 of network system 100 is a terminal level of network system 100 that can include for example a plurality of mobile platforms 122, 124, and 126, as well as other terminals, such as for example a computer 128.

As used herein, a mobile platform may also refer to any mobile platform or other portable electronic device including a cellular or mobile phone or other wireless communication device, tablet computer, personal communication system (PCS) device, personal navigation device (PND), Personal Information Manager (PIM), Personal Digital Assistant (PDA), or other suitable mobile computing device that can send and receive a communication. Mobile platforms 122, 124, and 126 may be capable of receiving wireless communication signals and/or navigation signals, such as for example navigation positioning signals. The term "mobile platform" is also intended to include devices that can communicate with a personal navigation device (PND), such as by short-range wireless, infrared, wireline connection, or other connections—regardless of whether satellite signal reception, assistance data reception, and/or position-related processing occurs at the device or at the PND.

In one example, a video conference may be held with one host and one or more guests using mobile platforms or other terminals in network system 100 in accordance with the teachings of the present invention. In one example, the host and the one or more guests may participate in a video conference using any of the terminal devices in the terminal level 3 106 of network system 100. Initially, before any terminal in Level 3 106 can participate in a video conference, the terminal must register with the conference server 106 at Level 1 102. In one example, conference server 106 is adapted to register, log in, and manage the terminals in terminal Level 3 106. In the example, conference server 106 is also adapted to register, log in, and manage the peer-to-peer stations included in the peer-to-peer network included in Level 2 104 of network system 100.

To illustrate, the example depicted in FIG. 1 shows that mobile platform 122 and mobile platform 124 initially register with conference server 108 in Level 1 102 of the network system 100. In the example, after mobile platform 122 and mobile platform 124 have registered with conference server 108, mobile platform 122 and mobile platform 124 can then be logged into conference server 108 to participate in a video conference. In one example, security may be enforced in the video conferencing system with every terminal or mobile platform being identified by a unique identifier, such as for example a hardware identifier. In addition, the user of each mobile platform is also required to enter the correct user identification and password in order to log in and participate in a video conference.

Conference server 108 will then find the nearest available peer-to-peer station in the peer-to-peer network of Level 2 104 of the network system 100 to the respective terminal. In the example, peer-to-peer station 116 is the nearest available peer-to-peer station to mobile platform 122, and peer-to-peer station 118 is the nearest available peer-to-peer station to mobile platform 124. Thus, in the example depicted in FIG. 1, mobile platform 122 is then connected directly to peer-to-peer station 116, and mobile platform 124 is then connected directly to peer-to-peer station 118 to begin the video conference.

Afterwards, peer-to-peer station 116 can then begin receiving communication data that is sent directly from mobile platform 122, and peer-to-peer station 118 can then begin receiving communication data sent directly from mobile platform 124 for the video conference. The communication data sent from each mobile platform may include video data that is generated with a built-in camera on each mobile platform, and/or audio data generated with a built-in microphone on each mobile platform. In one example, the communication data may include merged video-in-video (VIV) video/audio data that can be sent to the other terminals in the conference call.

Peer-to-peer station 116 and peer-to-peer station 118 can then send the respective communication data received from mobile platform 122 and mobile platform 124 directly to each other through a peer-to-peer connection established through the peer-to-peer network in Level 2 104 of the network system 100 in accordance with the teachings of the present invention. Peer-to-peer station 116 can then send the communication data received from mobile platform 124 through the peer-to-peer network to mobile platform 122, and peer-to-peer station 118 can send the communication data received from mobile platform 122 through the peer-to-peer network to mobile platform 124. Mobile platforms 122 and 124 can then playback the communication data received from the respective peer-to-peer servers 116 and 118 to their respective users to participate in the video conference.

It is appreciated that by using is a decentralized peer-to-peer network architecture as shown in FIG. 1, communication data can be received directly from other users in the video conference without having to require that all video conference traffic be sent through one centralized server, which therefore reduces the risks for congestion and or other bottlenecks in the network at the centralized server that may lower the quality of service in the video conference. Furthermore, reliability of the network may be increased since if any one peer-to-peer station in the network fails or becomes unavailable, another peer-to-peer station may be available to provide a peer-to-peer connection through the network in accordance with the teachings of the present invention. In addition, by including the peer-to-peer stations in Level 2 104 of the network system 104, the mobile platforms are not required to individually establish and maintain the peer-to-peer connections directly with all of the other mobile platforms participating in the video conference. Instead, the peer-to-peer stations in Level 2 104 of the network system 100 are responsible for send and receiving the required communication data through peer-to-peer network, and then forwarding the communication data as needed to the mobile platforms in level 3 106 of the network system 100 to provide the video conferencing in accordance with the teachings of the present invention.

In the example depicted in FIG. 1, it is noted that another terminal, such as for example mobile platform 126 may be connected directly to peer-to-peer station 116, which is also the nearest available peer-to-peer station to mobile platform 126 in the illustrated example. In the example, peer-to-peer station 116 may also receive communication data sent directly from mobile platform 126 to participate in the video conference with the mobile platform 122 and mobile platform 124. In this example, the communication data sent between mobile platform 122 and mobile platform 126 does not need to be sent through the peer-to-peer network since peer-to-peer station 116 is already the nearest available peer-to-peer station 116 to mobile platforms 122 and 126 in the example.

The example depicted in FIG. 1 also illustrates that another terminal, such as for example computer 128 may be connected directly to peer-to-peer station 118, which is the nearest available peer-to-peer station to computer 128. In the example, peer-to-peer station 118 may also receive communication data sent directly from computer 128 participate in the video conference with the mobile platform 122, mobile platform 124, and mobile platform 126. In the example, computer 128 may include for example a web browser running on computer 128 to view and listen to the communication data received from peer-to-peer station 118 as a web page. In the example, the computer 128 may include a camera to generate the video data included in the communication data sent from computer 128, and a microphone to generate the audio data included in the communication data sent from computer 128.

Therefore, one host and multiple guests can be in a video conference utilizing mobile platforms in accordance with the teachings of the present invention. In various examples, the host can also select or switch a guest or him or herself as the current speaker so that other guests can receive the current speaker's live audio and/or video in the video conference. In one example, the current speaker's local video may be displayed on his or her mobile platform, but the local audio can be muted to avoid echoing or feedback noise. In one example, the communication data may also be sent to archive server 110 in Level 1 102 of the network system 100 to record the communication data for archival and later playback.

Figure 2:
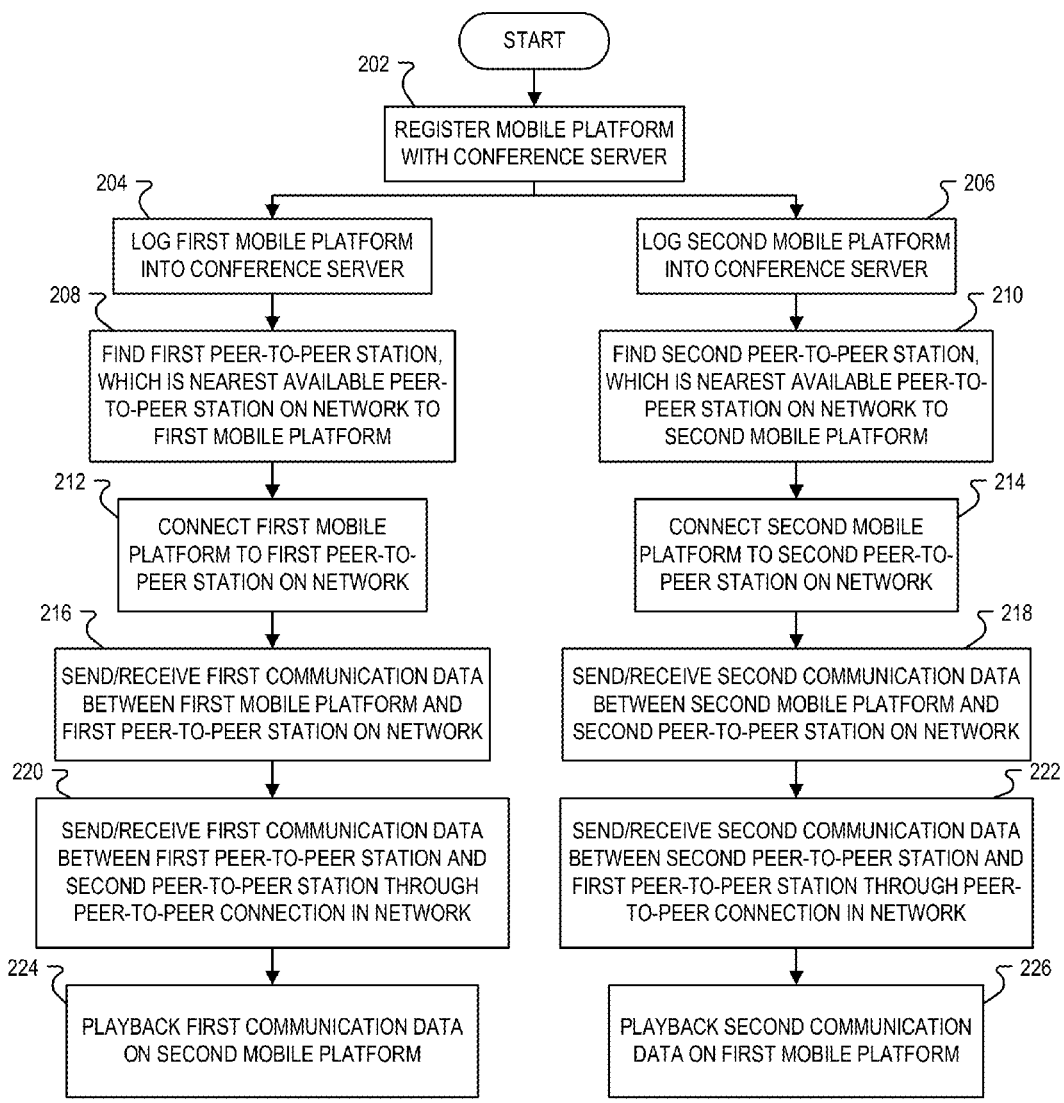
FIG. 2 shows one example of processing that may be performed in a three level network system including servers, peer-to-peer stations, and terminals that provide video conferencing for the mobile platforms in accordance with the teachings of the present invention.

FIG. 2 shows a flow chart 200 illustrating one example of processing that may be employed in a three level network system, such as for example the network system 100 illustrated in FIG. 1, including servers, peer-to-peer stations, and mobile platforms to provide video conferencing for the mobile platforms in accordance with the teachings of the present invention. As shown in FIG. 2 at process block 202, the mobile platforms in the network system are initially registered with the conference server. Then, process block 204 shows that after the mobile platforms have been registered, a first mobile platform may then be logged into the conference server, and process block 206 shows that a second mobile platform may be logged into the conference server.

Process block 208 shows that after the first mobile platform has logged into the conference server, the conference server finds the nearest available peer-to-peer station in the peer-to-peer network to the first mobile platform. Process block 210 shows that after the second mobile platform has logged into the conference server, the conference server finds the nearest available peer-to-peer station in the peer-to-peer network to the second mobile platform. Once the nearest available peer-to-peer stations are found, process block 212 shows that the first mobile platform is directly connected to a first peer-to-peer station, which is the nearest available peer-to-peer station to the first mobile platform. Similarly, process block 214 shows that the second mobile platform is directly connected to a second peer-to-peer station, which is the nearest available peer-to-peer station to the second mobile platform.

Once the mobile platforms are each directly connected their respective nearest available peer-to-peer stations in the peer-to-peer network, process block 216 shows that the video conference between the mobile platforms can be communicating with communication data being transferred (i.e., send/receive) directly between the first mobile platform and the first peer-to-peer station, and process block 218 showing communication data being transferred (i.e., send/receive) directly between the second mobile platform and the second peer-to-peer station. Process block 220 shows that the communications data received from the first mobile platform is then sent and received directly between the first peer-to-peer station and the second peer-to-peer station through a peer-to-peer connection in the peer-to-peer network. Similarly, process block 222 shows that the communications data received from the second mobile platform is then sent and received directly between the second peer-to-peer station and the first peer-to-peer station through the peer-to-peer connection in the peer-to-peer network. Process block 224 shows that the communications data that was sent and received between the first peer-to-peer station and the second peer-to-peer station may then be played back on the second mobile platform. Similarly, process block 226 shows that the communications data that was sent and received between the second peer-to-peer station and the first peer-to-peer station may then be played back on the first mobile platform.

Therefore, a video conferencing system is realized for mobile platforms using a three level network system including a peer-to-peer network in accordance with the teachings of the present invention.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A method for providing video conferencing for mobile platforms, comprising:
    logging a first mobile platform into a conference server on a network;
    finding a first peer-to-peer station on the network to connect with the first mobile platform, wherein the first peer-to-peer station on the network is a nearest available peer-to-peer station on the network to the first mobile platform;
    connecting the first peer-to-peer station on the network to the first mobile platform;
    receiving first communication data at the first peer-to-peer station directly from the first mobile platform;
    sending the first communication data directly from the first peer-to-peer station to a second peer-to-peer station through a peer-to-peer connection in the network; and
    sending the first communication data directly from the second peer-to-peer station to a second mobile platform connected to the second peer-to-peer station, wherein the second peer-to-peer station is a nearest available peer-to-peer station on the network to the second mobile platform.

2. The method of claim 1 further comprising sending the first communication data directly between the first peer-to-peer station and a third mobile platform connected to the first peer-to-peer station, wherein the first peer-to-peer station on the network is a nearest available peer-to-peer station on the network to the third mobile platform.

3. The method of claim 1 further comprising:
    logging a second mobile platform into the conference server on the network;
    finding a second peer-to-peer station on the network to connect with the second mobile platform, wherein the second peer-to-peer station on the network is a nearest available peer-to-peer station on the network to the second mobile platform;
    connecting the second peer-to-peer station on the network to the second mobile platform;
    receiving second communication data at the second peer-to-peer station directly from the second mobile platform;

sending the second communication data directly from the second peer-to-peer station to the first peer-to-peer station through the peer-to-peer connection in the network; and sending the second communication data directly from the first peer-to-peer station to the first mobile platform.

4. The method of claim 2 further comprising:

receiving third communication data at the first peer-to-peer station directly from the third mobile platform; and sending the third communication data directly from the first peer-to-peer station to the first mobile platform.

5. The method of claim 1 wherein the first communication data includes video data and audio data.

6. The method of claim 5 further comprising:

displaying the video data of the first communication data on the first mobile platform while simultaneously sending the first communication data from the first mobile platform to the first peer-to-peer station; and muting the audio data of the first communication data on the first mobile platform while displaying the video data of the first communication data on the first mobile platform to avoid echoing on the first mobile platform.

7. The method of claim 5 further comprising displaying the video data of the first communication data on the second mobile platform while simultaneously receiving the first communication data from the second peer-to-peer station; and playing the audio data of the first communication data on the second mobile platform while simultaneously displaying the video data of the first communication data on the second mobile platform.

8. The method of claim 1 further comprising registering the first mobile platform in the conference server prior to logging the first mobile platform into the conference server.

9. The method of claim 1 wherein the first communication data includes merged video-in-video data.

10. The method of claim 1 further comprising sending the first communication data directly from the first peer-to-peer station to an archive server on the network to record the first communication data.

11. The method of claim 10 further comprising sending the first communication data from the archive server to the second mobile platform for playback at a later time.

12. The method of claim 1 further comprising sending the first communication data directly from the second peer-to-peer station to a computer connected to the second peer-to-peer station, the computer includes an application to display the first communication data.

13. A network system for providing video conferencing for mobile platforms, comprising:

a conference server included in the network system;

a plurality of mobile platforms included in the network system, wherein a first mobile platform of the plurality of mobile platforms is connected to log into the conference server through the network system; and a plurality of peer-to-peer stations forming a peer-to-peer network within the network system, wherein the conference server is connected to the peer-to-peer network to find a first peer-to-peer station of the plurality of peer-to-peer stations that is a nearest available peer-to-peer station on the network to the first mobile platform, wherein the first mobile platform is coupled to send directly first communication data to the first peer-to-peer station, wherein the first peer-to-peer station is coupled to send the first communication data directly to a second peer-to-peer station of the plurality of peer-to-peer stations through a peer-to-peer connection in the peer-to-peer network, and wherein the second peer-to-peer station is coupled to send the first communication data directly to a second mobile platform of the plurality of mobile platforms, wherein the second peer-to-peer station is a nearest available peer-to-peer station on the network to the second mobile platform.

14. The network system of claim 13 wherein the first peer-to-peer station is further coupled to send the first communication data directly to a third mobile platform of the plurality of mobile platforms, wherein the first peer-to-peer station on the network is a nearest available peer-to-peer station on the network to the third mobile platform.

15. The network system of claim 13 wherein the second mobile platform is coupled to send second communication data directly to the second peer-to-peer station, wherein the second peer-to-peer station is coupled to send directly the second communication data to the first peer-to-peer station through the peer-to-peer connection in the peer-to-peer network, and wherein the first peer-to-peer station is coupled to send directly the second communication data to the first mobile platform.

16. The network system of claim 14 wherein the third mobile platform is coupled to send third communication data directly to the first peer-to-peer station, and wherein the first peer-to-peer station is further coupled to send the third communication data directly to the first mobile platform.

17. The network system of claim 13 wherein the first communication data includes video data and audio data.

18. The network system of claim 17 wherein the first mobile platform is coupled to display the video data of the first communication data on the first mobile platform while simultaneously sending the first communication data from the first mobile platform to the first peer-to-peer station, wherein the first mobile platform is coupled to mute the audio data of the first communication data on the first mobile platform while displaying the video data of the first communication data on the first mobile platform to avoid echoing on the first mobile platform.

19. The network system of claim 17 wherein the second mobile platform is coupled to display the video data of the first communication data on the second mobile platform while simultaneously receiving the first communication data from the second peer-to-peer station, and wherein the second mobile platform is further coupled to play the audio data of the first communication data on the second mobile platform while simultaneously displaying the video data of the first communication data on the second mobile platform.

20. The network system of claim 13 wherein the first communication data includes merged video-in-video data.

21. The network system of claim 13 further comprising an archive server in the network system, wherein the first peer-to-peer station is further coupled to send the first communication data directly from the first peer-to-peer station to the archive server on the network to record the first communication data.

22. The network system of claim 21 wherein the archive server is coupled to send the first communication data to the second mobile platform for playback at a later time.

23. The network system of claim 13 wherein the second peer-to-peer station is further coupled to send the first communication data directly to a computer connected to the second peer-to-peer station, wherein the computer includes an application to display the first communication data.

* * * * *